US012679737B1

(12) United States Patent　　　　　(10) Patent No.:　US 12,679,737 B1
Pumphrey et al.　　　　　　　　　　　　(45) Date of Patent:　　Jul. 14, 2026

(54) SYSTEM AND METHOD FOR GENERATING METAL OXIDE BORATE FROM A BORON SOLUTION

(71) Applicant: Westwind Farms Inc, Silverton, OR (US)

(72) Inventors: Kirk M. Pumphrey, Silverton, OR (US); James L. Guidry, Campti, LA (US)

(73) Assignee: Westwind Farms Inc., Silverton, OR (US)

( * ) Notice: Subject to any disclaimer, the term of this patent is extended or adjusted under 35 U.S.C. 154(b) by 0 days.

(21) Appl. No.: 19/543,792

(22) Filed: Feb. 18, 2026

(51) Int. Cl.
　　*C01B 35/12*　　　(2006.01)
　　*C02F 1/463*　　　(2023.01)
　　*C02F 11/121*　　(2019.01)
　　*C02F 101/10*　　(2006.01)

(52) U.S. Cl.
　　CPC ............ *C01B 35/127* (2013.01); *C02F 1/463* (2013.01); *C02F 11/121* (2013.01); *C01P 2004/16* (2013.01); *C01P 2004/64* (2013.01); *C02F 2101/108* (2013.01)

(58) Field of Classification Search
　　None
　　See application file for complete search history.

(56) References Cited

U.S. PATENT DOCUMENTS 4,925,641　A　5/1990　Kitamura et al.
12,024,444　B1　7/2024　Pumphrey et al.

FOREIGN PATENT DOCUMENTS

JP　　　　S63319298　A　　12/1988
TW　　　　1742986　B　*　10/2021

OTHER PUBLICATIONS

Huang et al, TW 1742986 B, English Translation from FIT (Year: 2021).*
Deniz, et al., "Operating Cost and Treatment of Boron from Aqueous Solutions by Electrocoagulation in Low Concentration", Global Challenges, Advanced Science News, 2018, 1-7.
Fisch, et al., "Crystal-chemistry of mullite-type aluminoborates Al18 B4 O33 and Al5 BO9 : A stoichiometry puzzle", Journal of Solid State Chemistry, Jan. 2011, 70-80.
Isa, et al., "Boron removal by electrocoagulation and recovery", Elsevier, Water Research 51, Dec. 27, 2013, 113-123.
Özgür, et al., "Synthesis of aluminum borate powder, fabrication and characterization of aluminum borate-based ceramics", Ceramics International, May 1, 2024, 14987-14995.
Wided, et al., "Evaluation of Boron Removal by Coagulation-Flocculation and Electrocoagulation", International Journal of Engineering Research & Technology (IJERT), Feb. 2014, 2923-2928.

(Continued)

*Primary Examiner* — Colin W. Slifka

(57)　　　　　　　ABSTRACT

In a method for extracting boron from a boron solution, a boron solution is processed at an electrocoagulation system utilizing metal electrodes to generate a sludge comprising water, metal oxide and boric oxide, wherein the boric oxide is encapsulated within the metal oxide. The sludge is filtered at a dewatering system to remove at least a portion of the water from the sludge to generate a cake. The cake is processed at a furnace to generate metal oxide borate.

13 Claims, 7 Drawing Sheets

(56)                    References Cited

OTHER PUBLICATIONS

Yilmaz, et al., "The Effects of Initial Boron Concentration on Energy Consumption in Boron Removal by Electrocoagulation", IBU Repository, https://eprints.ibu.edu.ba/items/show/2917, 2010, 79-85.

Zhang, et al., "Synthesis of Aluminium Borate Whiskers Through Wet Molten Salt Method", Ceramics-Silikáty 62 (1), Nov. 20, 2017, 81-85.

* cited by examiner

105

100

Feed Water 110

Boron Extraction System 120

Water Storage Tank 130

Boron Solution Tank 140

350

Cake
410
Metal Oxide + Boric Oxide + Water

Furnace
420

430
First Heating
(at least 100 °C)

440
Second Heating
(800-1000 °C)

445
Metal Oxide Borate
(nanorods)

SYSTEM AND METHOD FOR GENERATING METAL OXIDE BORATE FROM A BORON SOLUTION

BACKGROUND

Boron is a highly soluble nutrient that is necessary in agricultural operations, and stimulates plant growth. However, Boron accumulation in agricultural settings can lead to significant decreases in crop yield, and in some instances crop failures. To reduce boron accumulation in feed water used for agricultural settings, systems and methods for extracting boron from the feed water are used, resulting in a high concentration boron solution. This boron solution often has a concentration of boron that is too high to return to the source of the feed water, leaving a surplus of boron solution that is difficult to reuse or dispose of.

BRIEF DESCRIPTION OF THE DRAWINGS

The accompanying drawings, which are incorporated in and form a part of the Description of Embodiments, illustrate various non-limiting and non-exhaustive embodiments of the subject matter and, together with the Description of Embodiments, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DESCRIPTION OF EMBODIMENTS

Figure 1:
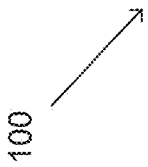
FIG. 1 is a block diagram of an example system for extracting boron from feed water, according to embodiments.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

NOTATION AND NOMENCLATURE

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "processing," "filtering," "concentrating," "generating," "heating," "monitoring," "ceasing," "activating," "operating," "returning," "conveying," "receiving," "processing," "storing," "passing," "adding," "adjusting," "performing," or the like, refer to the actions and processes of a system for extracting boric acid or generating metal oxide borate from a boron solution.

Overview of Discussion

Discussion begins with a description of an example system for extracting boron from feed water, according to embodiments. A description of an example system for extracting boric acid and generating metal oxide borate from a boron solution is then described, according to embodiments. A description of an example reactions at an electrocoagulation system is then provided, according to embodiments. A description of an example heating operations at a furnace for generating metal oxide borate nanorods is then provided, according to embodiments. Example operations for operating a system for generating metal oxide borate from a boron solution are then described, according to embodiments.

While boron is a nutrient that is necessary to promote healthy plant growth, overaccumulation of boron in plants can lead to boron toxicity, impacting plant yields and can even lead to crop loss. Furthermore, different regions can experience boron deficiency or boron accumulation, depending on geography, weather patterns, etc. To address the issue of boron overaccumulation in feed water, systems have been developed to remove boron from feed water to avoid boron accumulation and toxicity for improving crop performance. A boron solution (e.g., boron suspended in water) is typically a byproduct of the boron extraction from feed water. Storage and/or disposal of the boron solution presents a challenge for such systems.

Boron, in various concentrations, is useful as a fertilizer in regions suffering from boron deficiency. However, in lower concentrations, boron solutions may be economically disincentivized due to the transportation costs of the solutions. Embodiments described herein provide for the extraction of boron from a boron solution (e.g., boron suspended in water) in commercially viable forms. In the described embodiments, a cake including boric acid is generated. In some embodiments, the cake is further processed to generate metal oxide borate.

Electrocoagulation is a process that is used for treating contaminated wastewater, such as sewage, industrial waste, or produced water (oil field wastewater), that removes some contaminants from the wastewater such that the water can be reused in some form while the waste from the electrocoagulation process, also referred to as the "sludge" or "precipitant," is discarded. In particular, the sludge generated is generally highly toxic and requires specialized handling for disposal. Electrocoagulation is not typically used for treatment of domestic wastewater or agricultural water, and is generally only used where the wastewater presents disposal issues and/or a public health hazard.

In accordance with the described embodiments, a boron solution is processed at an electrocoagulation system utilizing metal electrodes to generate a sludge. The various embodiments, the boron solution is extracted from ground water or irrigation water that is not wastewater in that it is fit for agricultural purposes and/or human consumption (e.g., "agricultural water" as defined in 21 C.F.R. § 112.3 (2026)). The sludge includes water, metal oxide, and boric oxide, where the boric oxide is encapsulated within the metal oxide. In some embodiments, the processing the boron solution at the electrocoagulation system includes generating metal hydroxide and boric acid from the boron solution and generating the water, the metal oxide and the boric oxide from the metal hydroxide and the boric acid. In some embodiments, the metal electrodes include at least one of: aluminum, iron, magnesium, and manganese.

In accordance with some embodiments, prior to processing the boron solution at the electrocoagulation system, the boron solution is concentrated at a condenser system (e.g., a portion of the water is removed from the boron solution). In some embodiments, the condenser system includes an evaporation tank operating at ambient temperature.

The sludge is filtered at a dewatering system to remove at least a portion of the water from the sludge to generate a cake. As utilized herein, a "cake" is a solid mass including some water, and is also referred to as a "semi-dry cake." In some embodiments, the dewatering system includes a filter. In some embodiments, the water is returned to the boron solution for further processing. In some embodiments, the water is conveyed to an irrigation system.

The cake is processed at a furnace to generate metal oxide borate. In some embodiments, the furnace is a sintering furnace. In some embodiments, the cake is heated to at least 100 degrees Centigrade to remove additional water from the cake. In some embodiments, the cake is heated to 600 to 1400 degrees Centigrade to morphologically transform the cake into metal oxide borate nanorods. In some embodiments, the metal oxide borate nanorods have a width of 10 to 20 nanometers and a length of 70 to 120 nanometers.

It should be appreciated that various components of the above-described systems can be collocated at a single site or distributed at multiple sites. For example, in one embodiment, the electrocoagulation system and dewatering system for generating the cake can be located at a first location. The cake can then be conveyed or otherwise transported to the furnace at a second location for generating the metal oxide borate, while the water can be reintroduced into the boron solution tank and/or used in irrigation. The reduction/removal of water reduces the weight of the cake, thereby reducing transportation costs without compromising performance of the overall system.

It should be further appreciated that the embodiments described herein provide systems for extracting boron from a boron solution and generating metal oxide borate that are substantially zero waste. For instance, the excess water from the described systems can be returned to the boron solution for additional processing or distributed to a source of the feed water, without directing any of the liquids to wastewater systems, as the described systems are substantially closed looped systems where all drained liquids can be stored for later use or returned directly to the source of the feed water. As such, the described systems are particularly useful in irrigation and farming operations by reusing the processed liquids and reducing waste.

Example System for Extracting Boron from Feed Water

Turning now to the figures, FIG. 1 is a block diagram of an example system 100 for extracting boron from feed water, according to embodiments. In accordance with various embodiments, system 100 includes boron extraction system 120, water storage tank 130, and boron solution tank 140.

Feed water 110 is received at boron extraction system 120. It should be appreciated that feed water 110 can be any source of water that might include boron, where boron is an element that has many uses, including as a nutrient in agricultural operations. For example, feed water 110 may be irrigation runoff water from an orchard or field of crops (e.g., orchard 105). In accordance with the described embodiments, feed water 110 is fit for agricultural use and for human consumption and is not wastewater. For instance, feed water 110 satisfies the definition of "agricultural water" as defined in Title 21 of the U.S. Code, which recites that "[a]gricultural water means water used in covered activities on covered produce where water is intended to, or is likely to, contact covered produce or food contact surfaces, including water used in growing activities (including irrigation water applied using direct water application methods, water used for preparing crop sprays, and water used for growing sprouts) and in harvesting, packing, and holding activities (including water used for washing or cooling harvested produce and water used for preventing dehydration of covered produce)" (21 C.F.R. § 112.3 (2026)). Moreover, it should be appreciated that feed water 110 may derive from one or more sources, including, without limitation: rivers, streams, irrigation ditches, open canals, impounded water bodies (e.g., ponds, reservoirs, lakes), springs, wells, and municipal water systems.

Boron extraction system 120 is configured to extract boron from feed water 110. For example, boron extraction system 120 may utilize a boron selective resin (e.g., a boron-selective ion exchange resin) for extracting boron from feed water 110. As feed water 110 flows through a resin bed of such an example boron extraction system 120, boron is pulled out of feed water 110 and held in the resin bed via ion exchange, thus removing boron from feed water 110. An example of a boron extraction system utilizing a boron selective resin is described in U.S. Pat. No. 12,024,444.

In accordance with various embodiments, boron extraction system 120 produces at least two outputs: water and a boron solution. The water output is received at and stored within water storage tank 130. In some embodiments, the water of water storage tank 130 is distributed to a source of feed water 110 (e.g., orchard 105). It should be appreciated that the water stored in water storage tank 130 is generally usable for normal irrigation operations. It should be appreciated that the water stored in water storage tank 130 may also include various byproducts, impurities, compounds, etc. These are generally in such low quantities as to not impact the ability for the water of water storage tank 130 to be returned to the source of feed water 110.

The boron solution (e.g., boron suspended in water) output from boron extraction system 120 is stored within boron solution tank 140. It should be appreciated that the boron solution can have any concentration of boron, e.g., 1400 parts per million (PPM). It should be appreciated that the boron solution stored in boron solution tank 140 may also include various byproducts, impurities, compounds, etc. These are generally in such low quantities as to not impact the ability to further process the boron solution (e.g., at system 200 of FIG. 2).

It should be further appreciated that the operations of system 100 are substantially zero waste, in that most of the system outputs are reused either within system 100 or returned to the source of feed water 110, with the boron solution within boron solution tank 140 being used for further processing. No fluids or other outputs are directed to wastewater systems, as system 100 is a substantially closed looped system where all drained liquids can be stored for later use or returned directly to the source of feed water 110. As such, system 100 is particularly useful in irrigation and farming operations by reusing the processed liquids and reducing waste.

Figure 2:
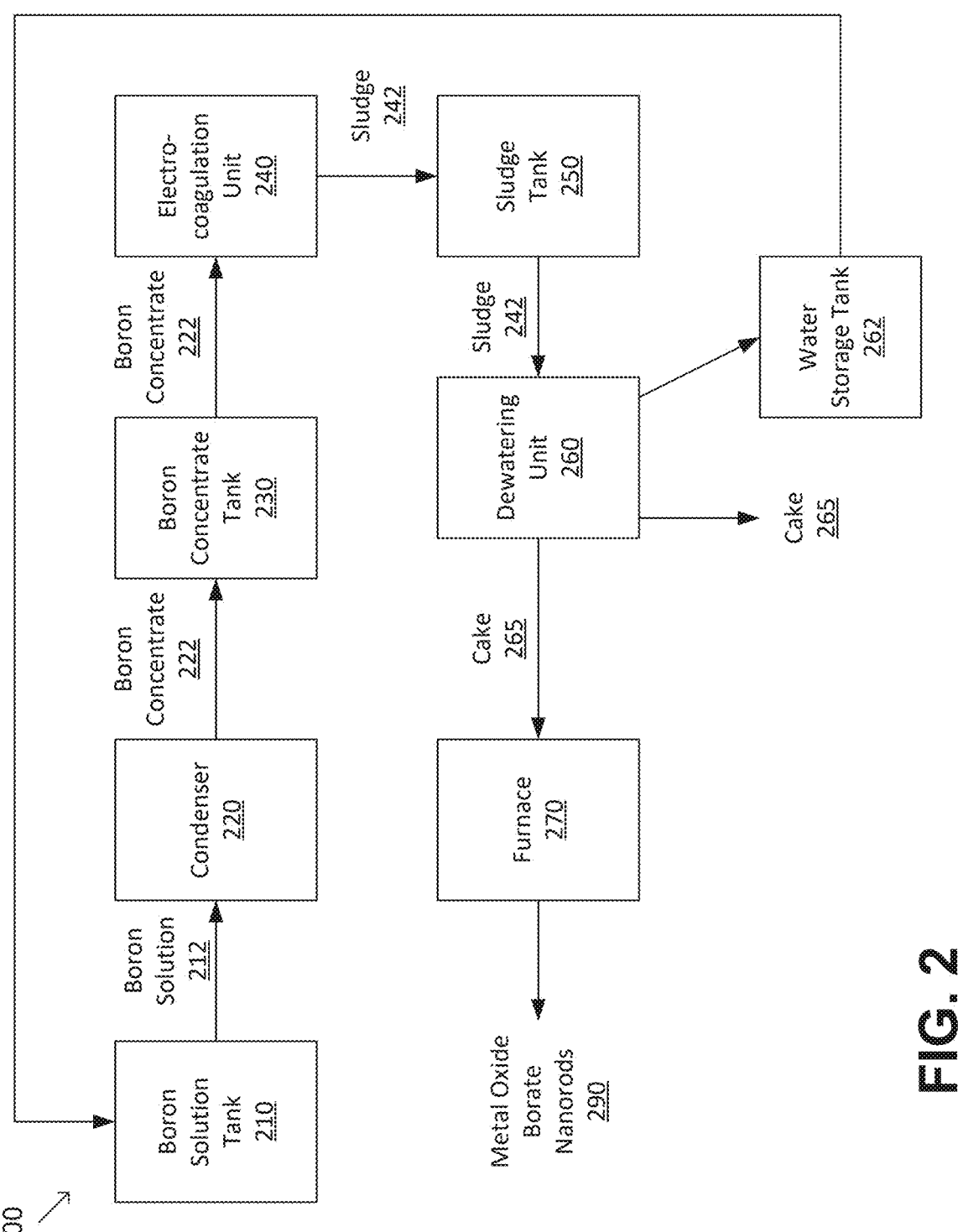
FIG. 2 is a block diagram of an example system for generating metal oxide borate from a boron solution, according to embodiments.

Example System for Generating Boric Oxide and Metal Oxide Borate from a Boron Solution Boron compounds, such as boric acid, boric oxide, and metal oxide borate, in various concentrations, have many different uses in agricultural and technological operations. Embodiments described herein provide for the extraction of boric oxide and/or metal oxide borate from a boron solution (e.g., boron suspended in water). FIG. 2 is a block diagram of an example system 200 for generating boric oxide and metal oxide borate from a boron solution, according to embodiments.

In accordance with various embodiments, system 200 includes electrocoagulation unit 240, dewatering unit 260, and furnace 270. In some embodiments, system 200 also includes one or more of: boron solution tank 210, condenser 220, boron concentrate tank 230, sludge tank 250, and water storage tank 262.

Boron solution tank 210 includes a boron solution 212, from which system 200 uses as input for generating boric oxide and metal oxide borate. In some embodiments, boron solution tank 210 is boron solution tank 140 of FIG. 1. For example, system 100 and system 200, or components thereof, may be collocated.

In accordance with some embodiments, condenser 220 receives boron solution 212 for concentrating boron solution 212 by removing some water to reduce the volume of boron solution 212, resulting in boron concentrate 222. In some embodiments, condenser 220 is a cooling tower operating at ambient temperature. In some embodiments, the cooling tower may include a motor and propeller (e.g., a fan) towards the top for pulling water vapor from boron solution 212 (e.g., evaporation). In other embodiments, condenser 220 includes a heat source for heating boron solution 212 to drive the evaporation of water from boron solution 212. For example, condenser 220 may be able to provide an 80-90% reduction in the volume of boron solution 212 (e.g., going from 1400 PPM boron in boron solution 212 to 7000 PPM boron in boron concentrate 222). The output of condenser 220 is boron concentrate 222, which is stored in boron concentrate tank 230.

Electrocoagulation unit 240 receives boron solution 212 for processing boron solution 212. In some embodiments, where system 200 includes condenser 220, boron concentrate 222 is received at electrocoagulation unit 240. For purposes of brevity, this description refers to the processing of boron solution 212 at electrocoagulation unit 240. It should be appreciated that, in accordance with some embodiments, boron solution 212 is in the form of boron concentrate 222 for processing at electrocoagulation unit 240, and that electrocoagulation unit 240 is configured to process boron solution 212 and boron concentrate 222 in substantially the same manner, as both boron solution 212 and boron concentrate 222 include boron suspended in water.

Electrocoagulation unit 240 is configured to process boron solution utilizing metal electrodes (e.g. sacrificial metal electrodes) to generate sludge 242, where sludge 242 includes water, metal oxide and boric oxide. In some embodiments, the boric oxide is encapsulated within the metal oxide. As utilized herein, electrocoagulation is an electrochemical process for processing a solution (e.g., boron solution 212) using sacrificial metal electrodes to remove boron from the solution. It should be appreciated that many different metals can be used as electrode material, including without limitation: aluminum, iron, magnesium, and manganese.

Figure 3A:
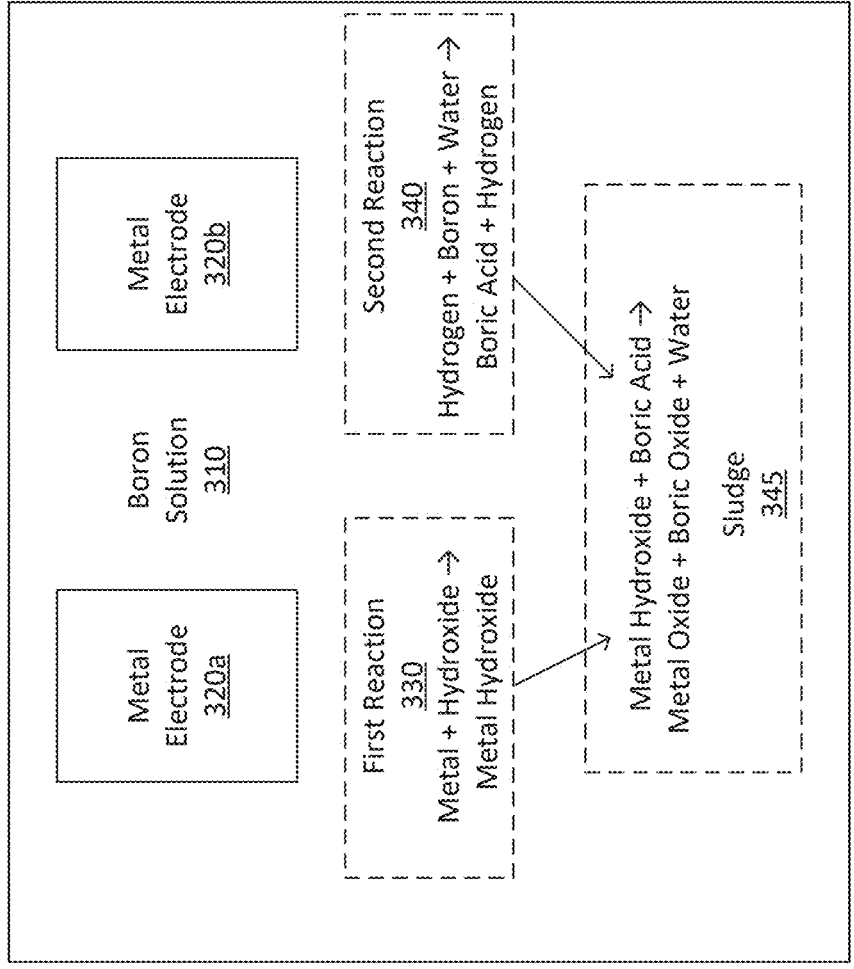
FIGS. 3A and 3B are schematics of example reactions at an electrocoagulation system, according to embodiments.
Figure 3A:
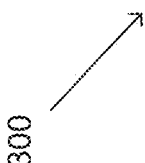
Figure 3B:
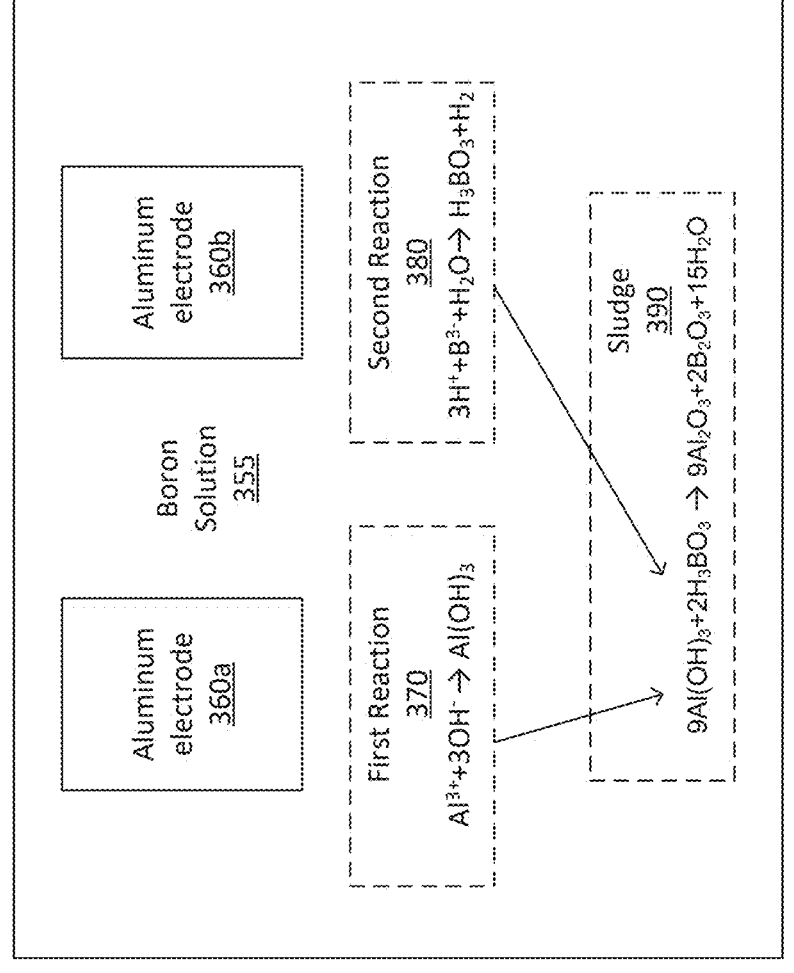
Figure 3B:
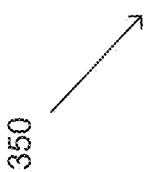

FIGS. 3A and 3B are schematics of example reactions at an electrocoagulation system (e.g., electrocoagulation unit 240), according to embodiments. With reference to FIG. 3A, electrocoagulation unit 300 is shown, with metal electrodes 320a and 320b located within boron solution 310 (e.g., boron solution 212 and/or boron concentrate 222 of FIG. 2). An electric current is applied to electrodes 320a and 320b, releasing metal cations into boron solution 310, causing a series of chemical reactions to commence. First reaction 330 generates a metal hydroxide and second reaction 340 generates boric acid. The metal hydroxide and the boric acid further react with each other to generate sludge 345, where sludge 345 includes water, metal oxide, and boric oxide, where the boric oxide is encapsulated within the metal oxide.

With reference to FIG. 3B, example reactions at electrocoagulation system 350 are shown, where aluminum electrodes 360a and 360b are located within boron solution 355 (e.g., boron solution 212 and/or boron concentrate 222 of FIG. 2). An electric current is applied to electrodes 360a and 360b, releasing aluminum cations into boron solution 355, causing a series of chemical reactions to commence. First reaction 370 generates aluminum hydroxide ($Al(OH)_3$) from aluminum ions ($Al^{3+}$) and hydroxides ($3OH^-$) within boron solution 355. Second reaction 380 generates boric acid ($H_3BO_3$) and hydrogen ($H_2$) from hydrogen ($3H^+$), boron ($B^{3-}$), and water ($H_2O$). The aluminum hydroxide and the boric acid react further to generate sludge 390, where sludge 390 includes water, aluminum oxide ($Al_2O_3$), and boric oxide ($B_2O_3$), where the boric oxide is encapsulated within the metal oxide.

With reference to FIG. 2, in some embodiments, sludge 242 (e.g., sludge 345 of FIG. 3A or sludge 390 of FIG. 3B) is received at sludge tank 250 for collection and storage. It should be appreciated that sludge tank 250 can be any type of container or receptacle capable of storing sludge 242.

Dewatering unit 260 receives sludge 242 and is operable to remove at least a portion of water from sludge 242 to generate cake 265. In some embodiments, dewatering unit 260 includes a filter for removing water from sludge 242. It should be appreciated that dewatering unit 260 can include any type of filter, including without limitation: a filter press, a belt filter, a screw press, a centrifuge, etc. For example, a 2 micron filter or 5 micron filter can be used, as the particle size within sludge is typically 300-500 nm, and the water is recirculated through dewatering unit 260 such that accumulation builds on the filter, effectively reducing the filter size to capture 300-500 nm sized particles. The solids produced at dewatering unit 260 are referred to as cake 265, where cake 265 includes less water content than sludge 242.

In some embodiments, the water that is removed from sludge 242 at dewatering unit 260 is stored within water storage tank 262. In some embodiments, the water is returned to boron solution tank 212 for further processing. In some embodiments, the water is conveyed to an irrigation system (e.g., at a source of feed water 110 of FIG. 1) for use in agricultural purposes. It should be appreciated that cake 265 may be stored for use in various technologies. For example, cake 265 may be used as a precursor within the ceramics industry. In some embodiments, cake 265 is transferred into receptacles for packaging and/or further processing. For instance, cake 265 may be transferred into ceramic or metal receptacles (sealed or unsealed) for heating in furnace 270, where the receptacles are capable of being heated and then conveyed after heating, without the need for repackaging.

For example, where aluminum electrodes are used within electrocoagulation unit 240, aluminum oxide ($Al_2O_3$), also known as alumina, and boric oxide ($B_2O_3$), are generated. Alumina, is useful in the production of ceramics. Boron can enhance alumina, by modifying its physical properties; increasing the hardness of ceramics. Aluminum oxide and boric oxide derived materials have increased hardness and high temperature stability. Moreover, various compounds can be produced from these materials, such as $Al_4B_2O_9$, which is stable to 1100° C. and $Al_{18}B_4O_{33}$, which is stable to 1900° C. In some embodiments, upon air drying the $Al_2O_3$—$B_2O_3$ material, the subsequent powders take on the form of a core-shell structure; with AlO(OH) as the shell and $B_2O_3$ as the core.

In other examples, where iron electrodes are used within electrocoagulation unit 240, iron oxide ($Fe_2O_3$) and boric oxide ($B_2O_3$), are generated. $Fe_2O_3$—$B_2O_3$ derived material composites known for their physical properties, such as thermal stability and conductivity. The $Fe_2O_3$—$B_2O_3$ from the electrocoagulation process can be used to form iron oxide borate, $FeBO_3$. Other applications include ceramics, glazes, and high-capacity batteries. $FeBO_3$ is known for its high performance in sodium-ion batteries.

In other examples, where magnesium electrodes are used within electrocoagulation unit 240, magnesium oxide ($Mg_2O_3$) and boric oxide ($B_2O_3$), are generated. $Mg_2O_3$—$B_2O_3$ derived material composites are known for their optical and mechanical properties, as well as their high temperature stability, heat and corrosion resistance, and elasticity.

Furnace 270 receives cake 265, in accordance with some embodiments. In some embodiments, furnace 270 is a sintering furnace. In some embodiments, a receptacle including cake 265 is received, where the receptacle is capable of being processed in furnace 270. Furnace 270 is configured to heat cake 265 for generating metal oxide borate. In some embodiments, furnace 270 heats cake 265 to at least 100° C. for a predetermined time based on the mass of the cake 265 for removing additional water from cake 265. Furnace 270 is configured to heat cake 265 at a predetermined rate (e.g., 5° C./minute) to 600-1400° C. to morphologically transform cake 265 into metal oxide borate nanorods 290. In some embodiments, the metal oxide borate nanorods have a width of 10 to 20 nanometers and a length of 70 to 120 nanometers.

Figure 4A:
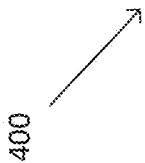
FIGS. 4A and 4B are schematics of example heating operations at a furnace for generating metal oxide borate nanorods, according to embodiments.
Figure 4A:
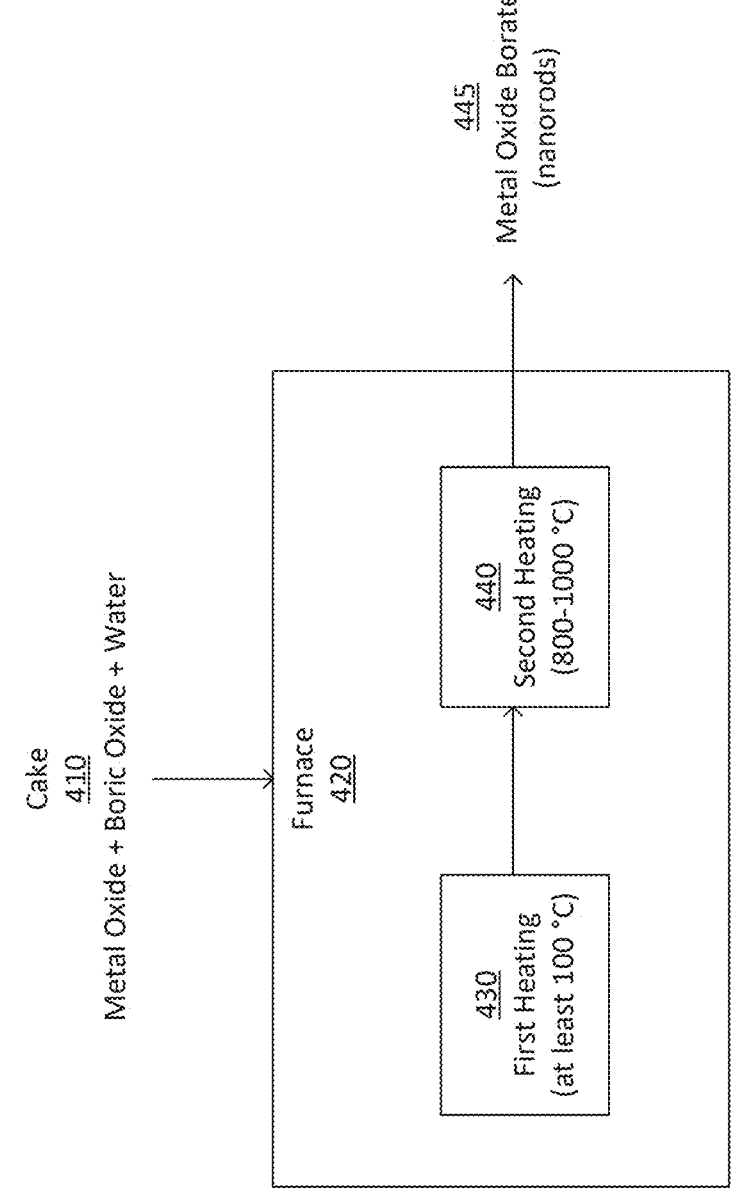
Figure 4B:
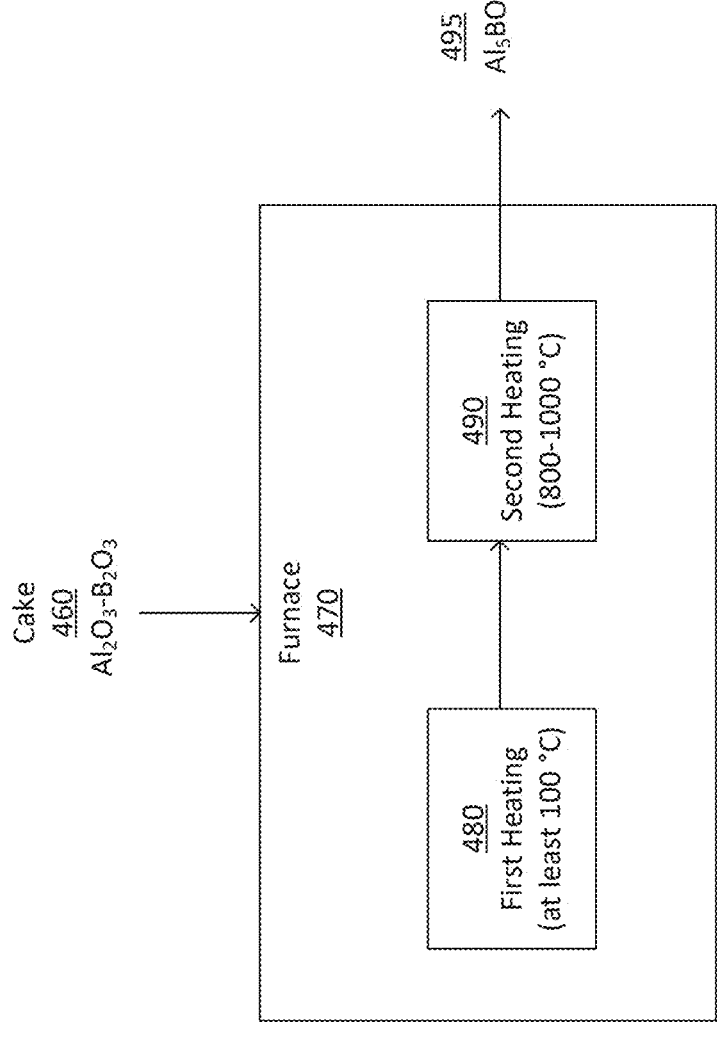
Figure 4B:
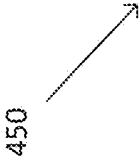

FIGS. 4A and 4B are schematics of example heating operations at a furnace for generating metal oxide borate nanorods, according to embodiments. With reference to FIG. 4A, schematic 400 is shown where cake 410 (e.g., cake 265 of FIG. 2) is received at furnace 420 (e.g., furnace 270 of FIG. 2). Cake 410 includes metal oxide, boric oxide, and water. In some embodiments, first heating 430 is performed on cake 410, where first heating 430 heats cake 410 to at least 100° C. for a predetermined time based on the mass of the cake 410 for removing additional water from cake 410. Second heating 440 is performed on cake 410, where second heating 440 heats cake 410 at a predetermined rate (e.g., 5° C./minute) to 600-1400° C. to morphologically transform cake 410 into metal oxide borate nanorods 445.

With reference to FIG. 4B, schematic 450 shows example heating operations at furnace 470, where aluminum electrodes where first used in the electrocoagulation system (e.g., electrocoagulation unit 240 of FIG. 2). Cake 460 (e.g., $Al_2O_3$—$B_2O_3$) is received at furnace 470 (e.g., furnace 270 of FIG. 2). Cake 460 includes aluminum oxide, boric oxide, and water. In some embodiments, first heating 480 is performed on cake 460, where first heating 480 heats cake 460 to at least 100° C. for a predetermined time based on the mass of the cake 460 for removing additional water from cake 460. Second heating 490 is performed on cake 460, where second heating 490 heats cake 460 at a predetermined rate (e.g., 5° C./minute) to 600-1400° C. to morphologically transform cake 460 into aluminum oxide borate nanorods 495 ($Al_5BO_9$).

Aluminum oxide borate, also known as mullite, and pentaaluminum hexaoxide borate, with the chemical formula, $Al_5O_6(BO_3)$, with an empirical formula of $Al_5BO_9$ is another material that can be formed from a $Al_2O_3$—$B_2O_3$ mixture. $Al_5BO_9$ is known for its low thermal expansion and low density. Heating of the AlO(OH)/$B_2O_3$ core-shell structure at temperature upwards of 900° C. leads to the formation of $Al_5BO_9$ nanorods. Both the AlO(OH)/$B_2O_3$ and $Al_5BO_9$ materials, each with its own physical properties, may be used in ceramics manufacturing.

In other embodiments, where magnesium electrodes are used within electrocoagulation unit 240, various compositions can be tailored by sintering at various temperatures ranging from 700° C. to 1200° C., as $Mg_xB_yO_z$ (with x=1, 2, or 3; y=2 or 4; and z=5, 6, or 7). $Mg_2B_2O_5$ exhibits thermoluminescence, has use as reinforcing agents in plastics and aluminum/magnesium alloys, and for ceramics.

It should be further appreciated that the operations of system 200 are substantially zero waste, in that most of the system outputs are reused either within system 200, returned to the source of feed water, with cake 265 and/or metal oxide borate nanorods for use within various agricultural, technical, or other uses.

Example Methods of Operation

Figure 5:
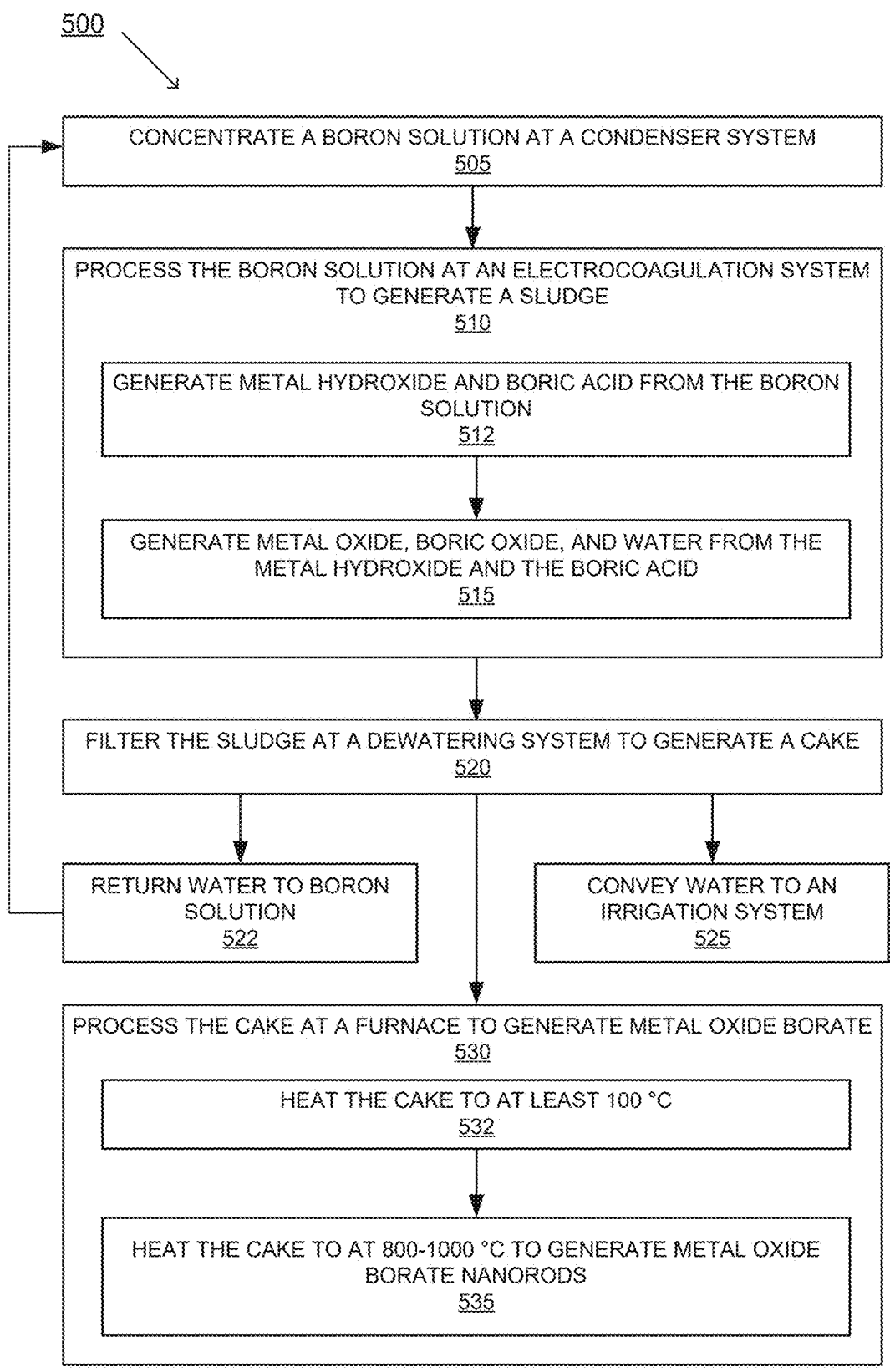
FIG. 5 is a flow diagram of an example method for generating metal oxide borate from a boron solution, according to embodiments.

FIG. 5 illustrates a flow diagram of an example method for generating metal oxide borate from a boron solution, according to various embodiments. Procedures of these methods will be described with reference to elements and/or components of various figures described herein. Although specific procedures are disclosed in the flow diagrams, such procedures are examples. That is, embodiments are well suited to performing various other procedures or variations of the procedures recited in the flow diagrams. It is appreciated that in some embodiments, the procedures may be performed in a different order than described, that some of the described procedures may not be performed, and/or that one or more additional procedures to those described may be performed.

The flow diagrams include some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software. In accordance with some embodiments, the described procedures and operations can be effectuated manually, automatically under control of a computer system, or a combination thereof. For example, an operation can be monitored by components of the described systems (e.g., concentration levels or heating temperatures and times, etc.) and a procedure can be automatically executed based on the monitoring. It will be understood that in some embodiments, automatic execution of procedures may be based on operational information of the described systems.

With reference to FIG. 5, flow diagram 500 illustrates an example process for generating metal oxide borate from a boron solution, according to some embodiments. At procedure 505 of flow diagram 500, in accordance with some embodiments, a boron solution is concentrated at a condenser system (e.g., a portion of the water is removed from the boron solution). In some embodiments, the condenser system includes an evaporation tank operating at ambient temperature At procedure 510, a boron solution (e.g., boron solution 212 and/or boron concentrate 222) is processed at an electrocoagulation system utilizing metal electrodes to generate a sludge. The sludge includes water, metal oxide, and boric oxide, where the boric oxide is encapsulated within the metal oxide. In some embodiments, as shown at procedure 512, the processing the boron solution at the electrocoagulation system includes generating metal hydroxide and boric acid from the boron solution. In some embodiments, as shown at procedure 515, the processing the boron solution at the electrocoagulation system further includes generating the water, the metal oxide and the boric oxide from the metal hydroxide and the boric acid. In some embodiments, the metal electrodes are selected from a group of metals consisting of: aluminum, iron, magnesium, and manganese.

At procedure 520, the sludge is filtered at a dewatering system to remove at least a portion of the water from the sludge to generate a cake. As utilized herein, a "cake" is a solid mass including some water, and is also referred to as a "semi-dry cake." In some embodiments, the dewatering system includes a filter. In some embodiments, as shown at procedure 522, the water is returned to the boron solution for further processing. In some embodiments, as shown at procedure 525, the water is conveyed to an irrigation system.

At procedure 530, the cake is processed at a furnace to generate metal oxide borate. In some embodiments, the furnace is a sintering furnace. In some embodiments, as shown at procedure 532, the cake is heated to at least 100 degrees Centigrade to remove additional water from the cake. In some embodiments, as shown at procedure 535, the cake is heated to 600 to 1400 degrees Centigrade to morphologically transform the cake into metal oxide borate nanorods. In some embodiments, the metal oxide borate nanorods have a width of 10 to 20 nanometers and a length of 70 to 120 nanometers.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for generating metal oxide borate from a boron solution, the method comprising:
   processing a boron solution at an electrocoagulation system utilizing metal electrodes to generate a sludge comprising water, metal oxide and boric oxide, wherein the boric oxide is encapsulated within the metal oxide;
   filtering the sludge at a dewatering system to remove at least a portion of the water from the sludge to generate a cake; and
   processing the cake at a furnace to generate metal oxide borate.

2. The method of claim 1, further comprising:
   concentrating the boron solution at a condenser system prior to processing the boron solution at the electrocoagulation system.

3. The method of claim 2, wherein the condenser system comprises an evaporation tank operating at ambient temperature.

4. The method of claim 1, wherein the dewatering system comprises a filter.

5. The method of claim 1, wherein the processing the boron solution at the electrocoagulation system comprises:
   generating metal hydroxide and boric acid from the boron solution; and
   generating the water, the metal oxide and the boric oxide from the metal hydroxide and the boric acid.

6. The method of claim 1, wherein the water is returned to the boron solution for further processing.

7. The method of claim 1, wherein the water is conveyed to an irrigation system.

8. The method of claim 1, wherein the furnace is a sintering furnace.

9. The method of claim 1, wherein the processing the cake at a furnace to generate the metal oxide borate comprises:
   heating the cake to at least 100 degrees Centigrade to remove additional water from the cake.

10. The method of claim 1, wherein the processing the cake at a furnace to generate the metal oxide borate comprises:
    heating the cake to 600 to 1400 degrees Centigrade to morphologically transform the cake into metal oxide borate nanorods.

11. The method of claim 10, wherein the metal oxide borate nanorods have a width of 10 to 20 nanometers and a length of 70 to 120 nanometers.

12. The method of claim 1, wherein the metal electrodes are selected from a group of metals consisting of: aluminum, iron, magnesium, and manganese.

13. A method for generating metal oxide borate nanorods from a boron solution, the method comprising:

processing a boron solution at an electrocoagulation system utilizing sacrificial metal electrodes to generate a sludge comprising water, metal oxide and boric oxide, wherein the boric oxide is encapsulated within the metal oxide; wherein the processing the boron solution at the electrocoagulation system comprises:

generating metal hydroxide and boric acid from the boron solution; and generating the water, the metal oxide and the boric oxide from the metal hydroxide and the boric acid;

filtering the sludge at a dewatering system to remove at least a portion of the water from the sludge to generate a cake; and processing the cake at a furnace to generate metal oxide borate, wherein the processing the cake at a furnace to generate the metal oxide borate comprises:

heating the cake to at least 100 degrees Centigrade to remove additional water from the cake; and heating the cake to 600 to 1400 degrees Centigrade to morphologically transform the cake into metal oxide borate nanorods.

* * * * *